United States Patent [19]
Satoh

[11] Patent Number: 5,704,269
[45] Date of Patent: Jan. 6, 1998

[54] RETAINER IN VALVE MECHANISM OF BOOSTER

[75] Inventor: Tohru Satoh, Saitama-Ken, Japan

[73] Assignee: Jidosha Kiki Co., Ltd., Tokyo, Japan

[21] Appl. No.: 614,685

[22] Filed: Mar. 13, 1996

[30] Foreign Application Priority Data

Apr. 28, 1995 [JP] Japan .................. 7-128944

[51] Int. Cl.$^6$ ................................... F15B 9/10
[52] U.S. Cl. ..................................... 91/376 R
[58] Field of Search ........................ 91/376 R

[56] References Cited

U.S. PATENT DOCUMENTS

| | | | |
|---|---|---|---|
| 4,712,468 | 12/1987 | Blot | 91/376 R |
| 4,794,844 | 1/1989 | Taft | 91/376 R |
| 5,355,771 | 10/1994 | Watanabe | 91/376 R |

FOREIGN PATENT DOCUMENTS 63-58061  4/1988  Japan.

*Primary Examiner*—F. Daniel Lopez
*Attorney, Agent, or Firm*—Flynn, Thiel, Boutell & Tanis, P.C.

[57] ABSTRACT

An improvement of a retainer which constitutes a valve mechanism for booster is disclosed. The retainer is used to secure the rear end of a valve element against a tubular terminal end of a valve body by abutment. The retainer comprises a tubular holder supporting the inner peripheral surface of the rear end and urging its outer peripheral surface into tight contact with the inner peripheral surface of the tubular terminal end, a securing portion, disposed rearward of the tubular holder and extending radially outward to be secured to the inner peripheral surface of the tubular terminal end, an anti-withdrawal portion disposed forwardly of the tubular holder and projecting radially outward, and a tapered portion disposed forwardly of the anti-withdrawal portion and extending radially inward and axially so as to be narrowed into a conical configuration. The construction, in particular, the provision of the tapered portion, facilitates fitting the rear end around the outer periphery of the tubular holder.

12 Claims, 3 Drawing Sheets

1

RETAINER IN VALVE MECHANISM OF BOOSTER

FIELD OF THE INVENTION

The invention relates to a valve mechanism for booster, and more particularly, to an improvement of a retainer which constitutes a valve mechanism.

DESCRIPTION OF THE PRIOR ART

A valve mechanism for booster in the prior art generally comprises a first valve seat formed on a valve body, a second valve seat formed on the rear side of a valve plunger which is coupled to an input shaft, a valve element, formed by an elastic member, which is adapted to be seated upon either first or second valve seat, and a retainer which secures the rear end of the valve element around the inner peripheral surface of the valve body in a tight contact therewith.

Normally, the retainer comprises a tapered portion having an increasing diameter in the forward direction which supports the inner peripheral surface of the rear end of the valve element to cause the outer peripheral surface thereof into tight contact with the inner peripheral surface of the valve body, a securing portion disposed rearward of the tapered portion and extending radially outward to be secured to the inner peripheral surface of a tubular terminal end, and a projecting portion disposed forwardly of the tapered portion and projecting radially inward, the tapered, the securing and the projecting portion being generally Z-shaped in section (Japanese Laid-Open Utility Model Application No. 58,061/1988).

The purpose of the tapered portion of the retainer is to prevent the rear end of the valve element from being withdrawn in the forward direction after a valve mechanism has been assembled into a valve body. The rear end of the valve element is also tapered so as to conform to the tapered configuration of the retainer.

When assembling the valve mechanism into the valve body, it is necessary that the rear end of the valve element be inserted, as a press fit, around the outer periphery of the tapered portion of the retainer from the front side. However, because the tapered portion of the retainer is enlarged toward the front side in a conical configuration while the inner peripheral surface at the rear end of the valve element is narrowed into a conical configuration, this assembly is not an easy work to perform.

To overcome such disadvantage, it is contemplated that the tapered portion be provided with a more gently tapering angle. However, when such choice is employed, there results a likelihood that the rear end of the valve element may be withdrawn from the retainer due to a pressure differential between a negative pressure which is exerted upon one side of the valve element and the atmospheric pressure which acts upon the other side.

SUMMARY OF THE INVENTION

In view of the foregoing, it is an object of the invention to facilitate an assembly of the rear end of the valve element around the retainer while effectively preventing the withdrawal of such rear end from the retainer.

Accordingly, in a valve mechanism for booster as mentioned, in accordance with the invention, the retainer comprises a tubular holder which supports the inner peripheral surface of the rear end of the valve element and which urges the outer peripheral surface of the rear end against the inner peripheral surface of the valve body, a securing portion disposed rearward of the tubular holder and extending radially outward to be secured to the inner peripheral surface of the tubular terminal end, a radially outwardly projecting anti-withdrawal portion disposed forwardly of the tubular holder, and a tapered portion disposed forwardly of the anti-withdrawal portion and extending radially inward and axially so as to be narrowed in a conical configuration.

With the described construction, the provision of the tapered portion which extends radially inward and axially so as to be narrowed in a conical configuration at a location forward of the anti-withdrawal portion allows it to be utilized in facilitating the assembly of the rear end of the valve element around the outer peripheral surface of the tubular holder of the retainer. Since the anti-withdrawal portion, which projects radially outward, is disposed forwardly of the tubular holder, the anti-withdrawal portion effectively prevents the disengagement of the rear end of the valve element from the tubular holder.

The tubular holder can be formed so as to be parallel to the inner peripheral surface of the valve body, and hence, it becomes unnecessary that the rear end of the valve element be tapered as in the prior art, thus improving the moldability when the valve element is being manufactured.

Above and other objects, features and advantages of the invention will become apparent from the following description of several embodiments thereof with reference to the drawings.

DETAILED DESCRIPTION OF THE EMBODIMENTS

Figure 1:
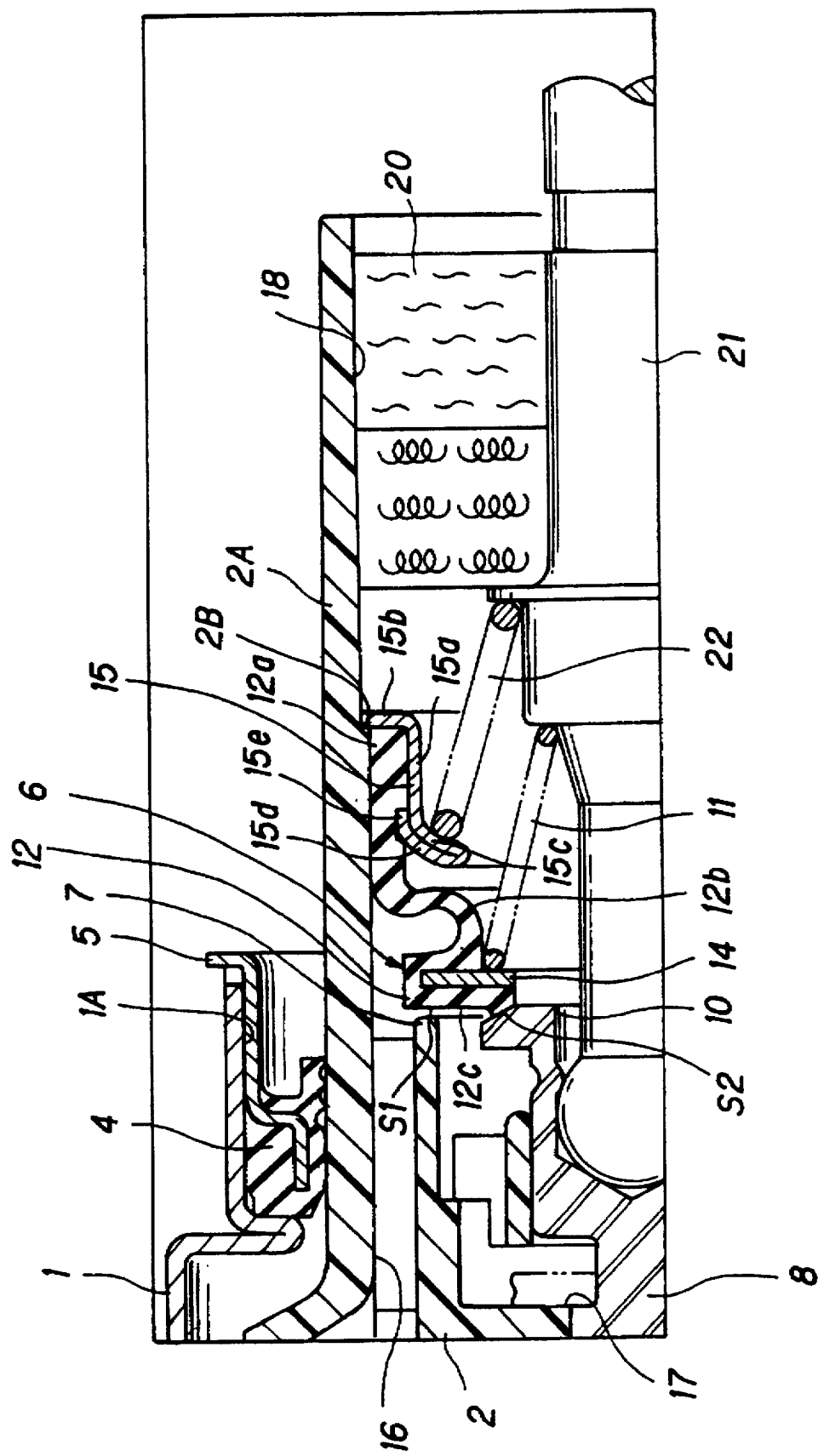
FIG. 1 is a longitudinal section of one embodiment of the invention.

Referring to the drawings, several embodiments of the invention will now be described. Initially referring to FIG. 1, a brake booster includes a shell 1 in which a substantially tubular valve body 2 is slidably disposed.

A rear end of the valve body 2 extends axially rearward to form a tubular terminal end 2A, which projects externally through an opening 1A formed in the shell 1 while maintaining a hermetic seal by means of a seal member 4. A front end of a retainer 5, which is shaped to be substantially tubular, is embedded in the rear end of the seal member 4, and the seal member 4 is secured to the shell 1 by inserting, as a press fit, the retainer 5 around the tubular terminal end 2A.

Disposed within the tubular terminal end 2A of the valve body 2 is a valve mechanism 6 which has a known construction and which is used to switch a fluid circuit between a constant and a variable pressure chamber, not shown, which are defined within the shell 1. The valve mechanism 6 comprises an annular, first valve seat 7 formed around the inner peripheral surface of the valve body 2, an annular, second valve seat 10 formed on the right end of a valve plunger 8, which is slidably disposed within the valve body 2, at a location radially inward of the first valve seat 7, and a valve element 12 which is urged from the right, as viewed in FIG. 1, by the resilience of a spring 11 into seating engagement upon either valve seat 7 or 10.

The valve element 12 is formed of a tubular elastic member, and includes a rear end 12a of an increased thickness which is mounted around the inner peripheral surface of the tubular terminal end 2A of the valve body 2, a curved portion 12b which is curved radially inward and extends from the rear end 12a, and a seating portion 12c formed at the distal end of the curved portion 12b. A metal backup plate 14 is embedded in the seating portion 12c. The rear end 12a of the valve element 12 is secured around the inner peripheral surface of the tubular terminal end 2A in tight contact therewith by a retainer 15 to be described in detail later.

The seating portion 12c of the valve element 12 includes an annular, first seat area S1 which is adapted to be seated upon the first valve seat 7, and a second seat area S2 which is located radially inward of the first seat area S1 and adapted to be seated upon the second valve seat 10. A space located radially outward of the first seat area S1 communicates with a constant pressure chamber mentioned above (but not shown) through an axial constant pressure passage 16 formed in the valve body 2. A space located intermediate the first and the second seat area S1, S2 communicates with a variable pressure chamber through a radial variable pressure passage 17 formed in the valve body 2. A space located radially inward of the second seat area S2 communicates with the atmosphere, acting as a source of pressure fluid, through a pressure passage 18 in which a filter 20 is provided.

The right end of the valve plunger 8 is pivotally connected with the distal end of an input shaft 21 so as to receive it in a rockable manner, while the terminal end of the input shaft 21 is connected to a brake pedal, not shown. A return spring 22 is disposed between the input shaft 21 and the retainer 15 to urge the input shaft 21 and its connected valve plunger 8 rearward, whereby these members normally assume inoperative positions shown.

The retainer 15 includes a tubular holder 15a which supports the inner peripheral surface of the rear end 12a of the valve element 12 to urge its outer peripheral surface into tight contact with the inner peripheral surface of the inner tubular terminal end 2A. It is to be noted that the outer peripheral surface of the tubular holder 15a is formed to be parallel to the inner peripheral surface of the tubular terminal end 2A. A portion of the retainer which is located rearward of the tubular holder 15a is bent radially outward to define a securing portion 15b, which is brought into abutment against a step 2B formed around the inner peripheral surface of the tubular terminal end 2A, thus securing the retainer 15 around the inner peripheral surface of the tubular terminal end 2A.

On the other hand, the tubular holder 15a forwardly continues to an inner tapered portion 15c which extends radially inward and axially so as to be narrowed into a conical configuration, and the distal end of the inner tapered portion 15c is folded back upon itself to extend radially outward so that it continues to an outer tapered portion 15d which is disposed in overlapping relationship with the inner tapered portion 15c on the front side thereof. The distal end of the outer tapered portion 15d is brought into overlapping relationship with the outer peripheral surface of the tubular holder 15a, thus defining an anti-withdrawal portion 15e which projects radially outward of the outer peripheral surface of the tubular holder 15a.

The return spring 22 abuts against a bent formed between the inner tapered portion 15c and its distal end so that the resilience of the return spring 22 urges the securing portion 15b into abutment against the step 2B to secure the retainer 15 in position around the inner peripheral surface of the tubular terminal end 2A.

In the described construction, when fitting the rear end 12a of the valve element 12 around the outer periphery of the tubular holder 15a of the retainer 15, it will be seen that the assembly of the rear end 12a around the tubular holder 15a is facilitated by the provision of the tapered portions 15c, 15d at the distal end of the retainer 15 which are narrowed in a conical configuration. When the rear end 12a is assembled around the outer periphery of the tubular holder 15a, it will be seen that the presence of the anti-withdrawal portion 15e, which projects radially outward on the front side of the tubular holder 15a, is effective to prevent the disengagement of the rear end 12a from the tubular holder 15a.

Because the outer peripheral surface of the tubular holder 15a is formed to extend parallel to the inner peripheral surface of the tubular terminal end 2A, it is unnecessary that the rear end 12a be tapered as in the prior art, but can be manufactured with a uniform thickness, which enables the moldability when the valve element is being manufactured to be improved.

Subsequent to the assembly of the rear end 12a of the valve element 12 around the retainer 15, the combination of the valve element 12 and the retainer 15 is assembled into the tubular terminal end 2A.

Second Embodiment

Figure 2:
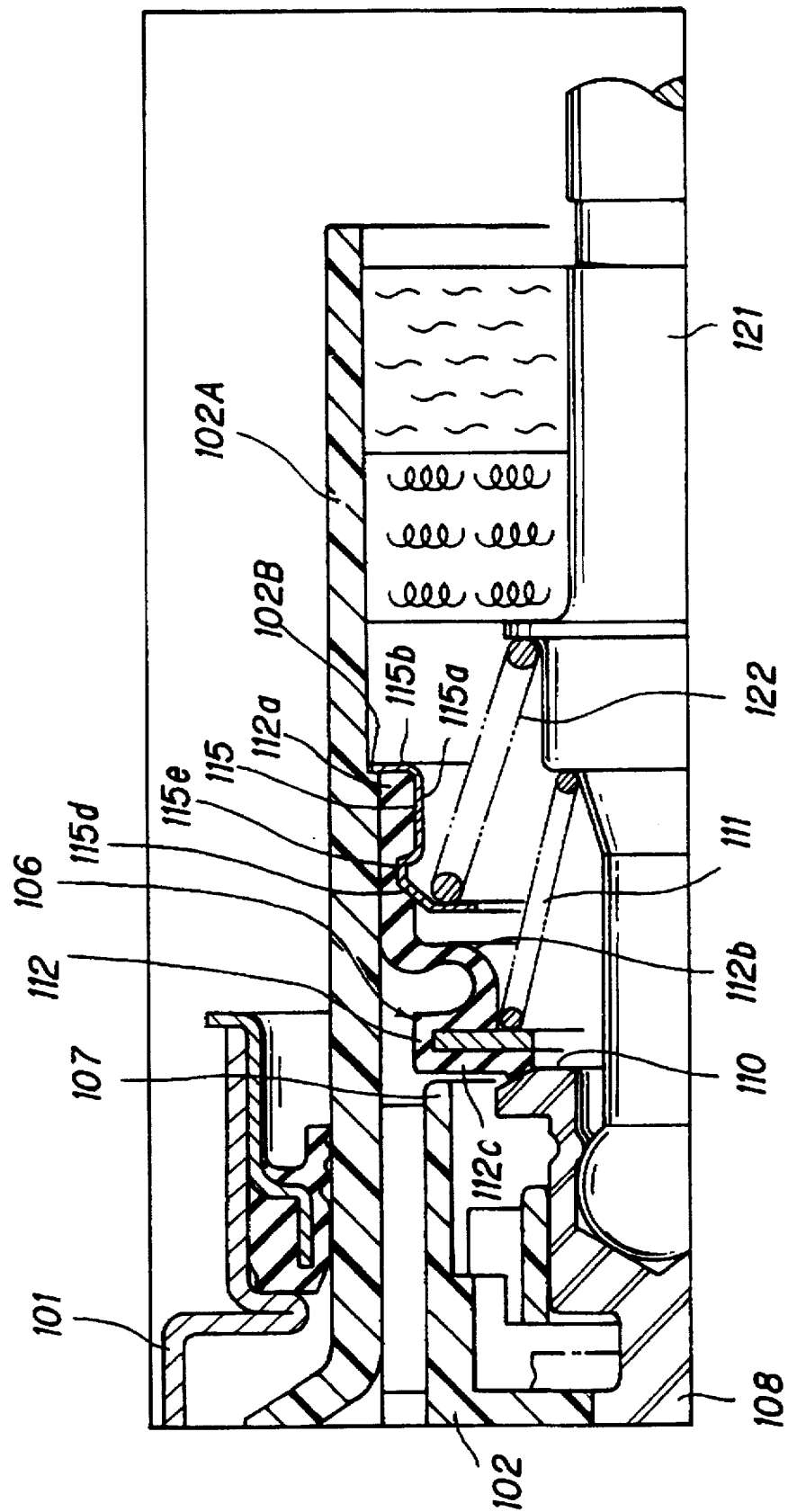
FIG. 2 is a longitudinal section of a second embodiment of the invention.

FIG. 2 shows another embodiment of the invention, in which a tubular holder 115a and a securing portion 115b are constructed in the same manner as described in connection with the first embodiment. The tubular holder 115a forwardly continues to an anti-withdrawal portion 115e, which projects radially outward in an annular form, and the anti-withdrawal portion 115e forwardly continues to a tapered portion 115d, which extends radially inward and axially so as to be narrowed into a conical configuration, the distal end of the tapered portion 115d being bent to extend radially inward.

In other respects, the arrangement is similar to the first embodiment, and accordingly, corresponding parts are designated by like numerals and characters as used in the description of the first embodiment, to which 100 is added.

Third Embodiment

Figure 3:
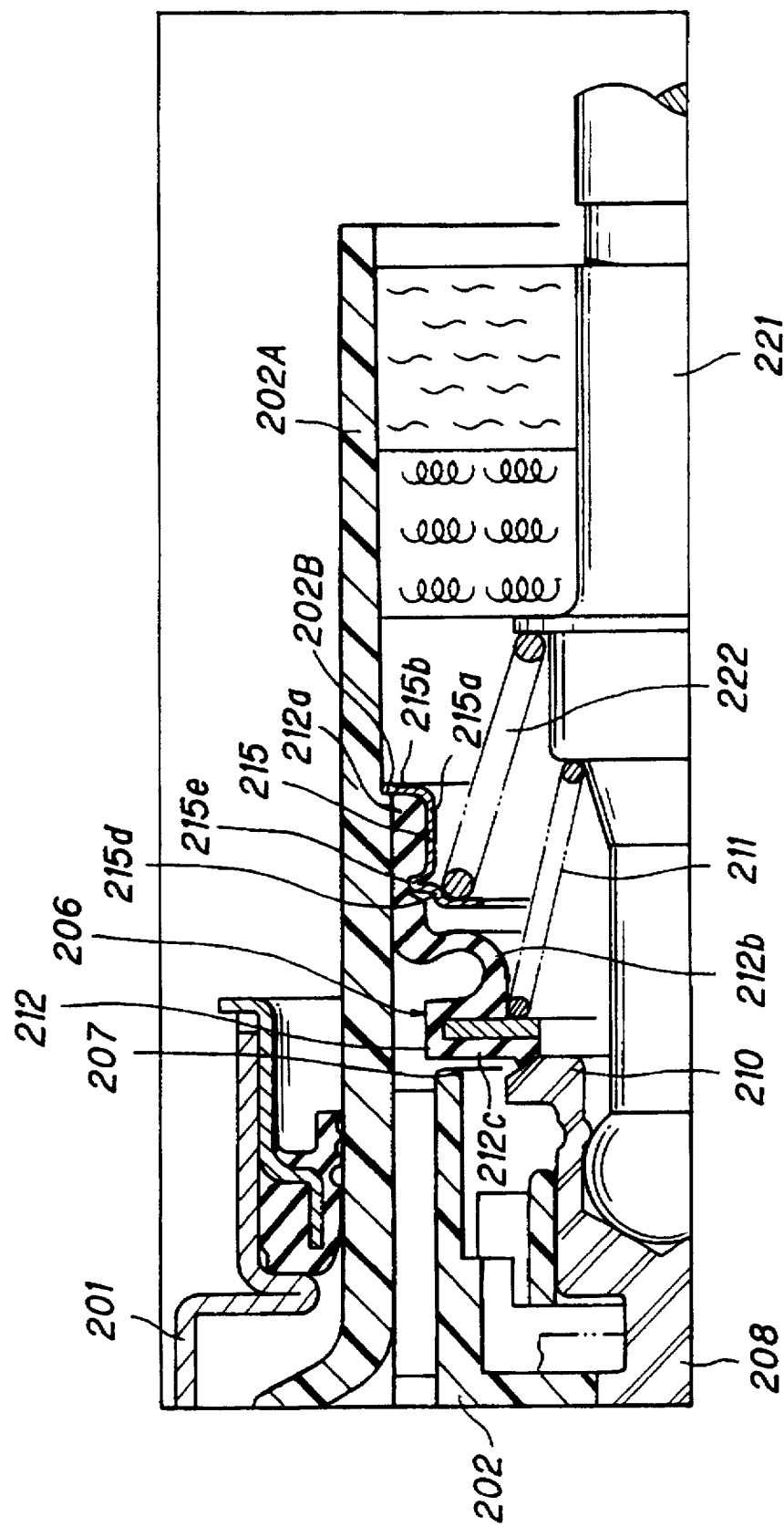
FIG. 3 is a longitudinal section of a third embodiment of the invention.

FIG. 3 shows a third embodiment of the invention, in which a tubular holder 215a and a securing portion 215b are constructed in the same manner as in the first embodiment. The tubular holder 215a forwardly continues to an anti-withdrawal portion 215e, which comprises a rear projection which projects radially outward, and a front projection which is folded back from the distal end of the rear projection to be folded upon itself. The front projection, which forms part of the anti-withdrawal portion 215e, forwardly continues to a tapered portion 215d which extends radially inward and axially forward to be narrowed into a conical configuration, with the distal end of the tapered portion 215d being bent to extend radially inward. In other respects, the arrangement is similar as in the first embodiment, and accordingly, corresponding parts are designated by like numerals and characters as used in the description of the first embodiment, to which 200 is added.

In each embodiment described above, the securing portions 15b, 115b, 215b are provided in the form of a flange extending radially outward, but they may be integrally provided with a tubular portion which extends axially rearward from the outer end of the securing portion to be fitted around the inner peripheral surface of the tubular terminal end 2A.

While the invention has been described above in connection with several embodiments thereof, it should be understood that a number of changes, modifications and substitutions therein are possible by one skilled in the art without departing from the spirit and the scope of the invention defined by the claims.

What is claimed is:

1. In a valve mechanism for booster including a first valve seat formed on a valve body, a second valve seat formed on a rear portion of a valve plunger connected to an input shaft, a valve element formed of an elastic member and adapted to be seated upon either the first or second valve seat, and a retainer for securing a rear end of the valve element in tight contact with an inner peripheral surface of the valve body, the valve body having a terminal end;

the retainer comprising a tubular holder supporting an inner peripheral surface of the rear end of the valve element and urging an outer peripheral surface of the rear end of the valve element into tight contact with the inner peripheral surface of the valve body, a securing portion disposed rearward of the tubular holder and extending radially outward to be secured to an inner peripheral surface of the terminal end, an anti-withdrawal portion disposed forward of the tubular holder and projecting radially outward, and a tapered portion disposed forwardly of the anti-withdrawal portion and extending radially inward and axially so as to be narrowed into a conical configuration; and the tapered portion of the retainer comprising an inner tapered portion which continues forwardly from the tubular holder and extends radially inwardly and axially, and an outer tapered portion which is formed by folding from a distal end of the inner tapered portion upon itself to overlie the inner tapered portion on the front side thereof, the anti-withdrawal portion continuing from the distal end of the outer tapered portion and projecting radially outward beyond an outer peripheral surface of the tubular holder.

2. The retainer according to claim 1 in which an outer peripheral surface of the tubular holder of the retainer is formed to extend parallel to the inner peripheral surface of the terminal end of the valve body.

3. The valve mechanism according to claim 1 in which the rear end of the valve element has an increased thickness and is mounted on the inner peripheral surface of the terminal end of the valve body, and the valve element has a curved portion extending from the rear end and curving radially inward, and a seating portion disposed at a distal end of the curved portion and adapted to be seated upon either valve seat.

4. The retainer according to claim 1 in which the rear end of the valve element has a uniform radial thickness.

5. In a valve mechanism for booster including a first valve seat formed on a valve body, a second valve seat formed on a rear portion of a valve plunger connected to an input shaft, a valve element formed of an elastic member and adapted to be seated upon either the first or second valve seat, and a retainer for securing a rear end of the valve element in tight contact with an inner peripheral surface of the valve body, the valve body having a terminal end;

the retainer comprising a tubular holder supporting an inner peripheral surface of the rear end of the valve element and urging an outer peripheral surface of the rear end of the valve element into tight contact with the inner peripheral surface of the valve body, a securing portion disposed rearward of the tubular holder and extending radially outward to be secured to an inner peripheral surface of the terminal end, an anti-withdrawal portion disposed forward of the tubular holder and projecting radially outward, the anti-withdrawal portion of the retainer is formed to project continuing forwardly from the tubular holder, and a tapered portion disposed forwardly of the anti-withdrawal portion and extending radially inwardly and axially so as to be narrowed into a conical configuration, the tapered portion being formed so as to be forwardly continuing from the anti-withdrawal portion.

6. The retainer according to claim 5, wherein an outer peripheral surface of the tubular holder extends parallel to the inner peripherial surface of the terminal end of the valve body.

7. The valve mechanism according to claim 5, wherein the rear end of the valve element has an increased thickness and is mounted on the inner peripheral surface of the terminal end, and wherein the valve element has a curved portion extending from the rear end and curving radially inward, and a seating portion disposed at a distal end of the curved portion and being adapted to seat upon either valve seat.

8. The retainer according to claim 5, wherein the rear end of the valve element has a uniform radial thickness.

9. In a valve mechanism for booster including a first valve seat formed on a valve body, a second valve seat formed on a rear portion of a valve plunger connected to an input shaft, a valve element formed of an elastic member and adapted to be seated upon either the first or second valve seat, and a retainer for securing a rear end of the valve element in tight contact with an inner peripheral surface of the valve body, the valve body having a terminal end;

the retainer comprising a tubular holder supporting an inner peripheral surface of the rear end of the valve element and urging an outer peripheral surface of the rear end of the valve element into tight contact with the inner peripheral surface of the valve body, a securing portion disposed rearward of the tubular holder and extending radially outward to be secured to an inner peripheral surface of the terminal end, an anti-withdrawal portion disposed forward of the tubular holder and projecting radially outward, and a tapered portion disposed forwardly of the anti-withdrawal portion and extending radially inwardly and axially so as to be narrowed into a conical configuration; and the anti-withdrawal portion of the retainer comprising a rear projection which is formed by continuing forwardly from the tubular holder to project radially outward, and a front projection which is formed by folding from a distal end of the rear projection upon itself so as to overlap the rear projection on a front side thereof, the tapered portion continuing from the front projection.

10. The retainer according to claim 9, wherein an outer peripheral surface of the tubular holder extends parallel to the inner peripheral surface of the terminal end of the valve body.

11. The valve mechanism according to claim 9, wherein the rear end of the valve element has an increased thickness and is mounted on the inner peripheral surface of the terminal end, and wherein the valve element has a curved portion extending from the rear end and curving radially inward, and a seating portion disposed at a distal end of the curved portion and being adapted to seat upon either valve seat.

12. The retainer according to claim 9, wherein the rear end of the valve element has a uniform radial thickness.

* * * * *